United States Patent [19]

Suzuki et al.

[11] Patent Number: 4,659,636

[45] Date of Patent: Apr. 21, 1987

[54] SEALED STORAGE BATTERY

[75] Inventors: Yoshie Suzuki, Chigasaki; Kiichi Koike, Fujisawa; Minoru Kadowaki, Yokohama; Minoru Yoshinaka, Fujisawa, all of Japan

[73] Assignee: Matsushita Electric Industrial Co., Ltd., Kadoma, Japan

[21] Appl. No.: 807,067

[22] PCT Filed: Nov. 22, 1984

[86] PCT No.: PCT/JP84/00561

§ 371 Date: Nov. 29, 1985

§ 102(e) Date: Nov. 29, 1985

[87] PCT Pub. No.: WO85/04526

PCT Pub. Date: Oct. 10, 1985

[30] Foreign Application Priority Data

Mar. 29, 1984 [JP] Japan ................................. 59-61564

[51] Int. Cl.[4] ..................... H01M 10/06; H01M 2/02
[52] U.S. Cl. ......................................... 429/54; 429/57; 429/60; 429/159
[58] Field of Search ................ 429/57, 136, 139, 153, 429/159, 163, 176, 225, 54, 60

[56] References Cited

U.S. PATENT DOCUMENTS

| 1,422,815 | 7/1922 | Beck | 429/136 |
|---|---|---|---|
| 2,847,495 | 8/1958 | Nagorski | 429/153 X |
| 3,506,495 | 4/1970 | Reilly et al. | 429/86 |
| 3,725,133 | 4/1973 | Pollack et al. | 429/162 X |
| 3,794,525 | 2/1974 | Kaye | 429/159 X |
| 4,374,186 | 2/1983 | McCartney et al. | 429/154 |
| 4,383,011 | 5/1983 | McClelland et al. | 429/54 |
| 4,525,926 | 7/1985 | Pearson | 429/225 X |

FOREIGN PATENT DOCUMENTS 59-207558 11/1984 Japan .

Primary Examiner—Anthony Skapars
Attorney, Agent, or Firm—Wenderoth, Lind & Ponack

[57] ABSTRACT

The present invention is a sealed storage battery wherein a plurality of flattened unitary cells formed by sealing a polar plate group in an outer bag made of a sheet or a film of synthetic resin are stacked in a direction thicknesswise thereof and accommodated in a pressurized manner in a casing.

By so constructing, the unitary cells can be uniformly applied with pressure with the increased capacity for efficiency for a battery, any possible deviation in the lifetime of the cells can be eliminated, and a highly reliable battery of flat type easy to fabricate, and suitable for use as an electric power source for portable electric appliances can be obtained.

8 Claims, 7 Drawing Figures

SEALED STORAGE BATTERY

FIELD OF TECHNOLOGY

The present invention relates to a sealed storage battery and, more particularly, to a storage battery comprising a plurality of unitary cells wherein polar plate groups are sealed in outer bags made of a film or sheet of synthetic resin.

BACKGROUND ART

With portable electric appliances such as VTR, vacuum cleaner and others being rendered compact, a battery for use as an electric power source therefor has been strongly desired to be made compact. As an electric power source for the above described types of portable electric appliances, a lead storage battery and a nickel-cadmium storage battery are mainly utilized.

The lead storage battery makes use of a battery case of synthetic resin having a plurality of, for example, three, cell chambers, and is of such a construction that polar plate groups are inserted into the respective cell chambers with cells being connected together by means of a connector means fluid-tightly passing through partition walls.

In the nickel-cadmium storage battery, an exemplary type is that a plurality of unitary cells armored in metallic vessels are combined together and are in turn inserted into a single vessel.

However, in the lead storage battery of the above described construction, there is a problem in that not only is it difficult to make the battery thin because of the partition walls separating the cell chambers, but also the manufacturing cost tends to become high because a complicated fabricating step is required wherein the polar plate groups are incorporated individually into the respective cell chambers in a battery case. Also, in the lead storage battery, while it is essential to apply an appropriate pressure, that is, a so-called group pressure to the polar plate groups in order to prevent active substances of an anode from being particulated and to prolong the lifetime of the battery, a problem arises wherein, since the group pressure differs from one cell to another, the cells are not uniform in lifetime. Moreover, in a sealed storage battery wherein the quantity of electrolyte is controlled, since the quantity of the electrolyte retained by a separator means varies when the group pressure differs from one cell to another, a disadvantage arises in that the capacity varies. Even in the nickel-cadmium storage battery, since the completely independent cells are combined, there is a problem in that wasteful spaces are many and the capacity efficiency for a battery is low.

DISCLOSURE OF THE INVENTION

The present invention has for its object to eliminate the conventional existing disadvantages such as described above and to provide a highly reliable sealed storage battery which is thin and easy to fabricate.

The sealed storage battery of the present invention comprises a plurality of flattened unitary cells which comprises polar plate groups including an anode plate, a cathode plate and a separator separating these polar plates, and outer bags made of sheets or films of synthetic resin and into which the polar plate groups and electrolyte retained by the polar plate groups are sealed, and a casing for accommodating the plurality of the unitary cells in a form stacked one above the other in a direction thicknesswise of the unitary cells wherein, owing to the casing, the unitary cells are held under pressure in said stacking direction, and said casing has enough rigidity to withstand a reactive force relative to said pressure.

The unitary cells have a sealed area provided at a portion of the outer bag surrounding the perimeters of the polar plate groups, a pair of terminal pieces extending outwards through the sealed area, and a safety valve provided in a portion of the outer bag, and these unitary cells are electrically series-connected by interconnecting said terminal pieces.

In a preferred form of the unitary cells, the sealed are of the outer bag is constituted by a heat-bonded area interconnecting the sheets or films of synthetic resin, and the safety valve has a tight contact area at which the resin films or sheets overlap each other without being fusion-bonded together and is so constructed that, when the bag interior is excessively pressurized, gas inside the outer bag can escape to the outside by internally spreading the tight contact area to open.

The polar plate groups are so designed that the substantial electric capacity of the cathode plate is higher than that of the anode plate, and the electrolyte is retained by both the polar plates and the separator and is controlled to such an extent that no liberated liquid may be present. Accordingly, during the charging, oxygen gas is generated from the anode plate, which is in turn absorbed by the cathode plate. The safety valve provided in the unitary cell is provided for discharging gas to the outside when the interior of the cell is excessively pressurized as a result of the generation of the oxygen gas in a quantity exceeding the absorbing capability of the cathode upon, for example, the quick charging.

In the storage battery of the present invention, since no partition wall is provided in the casing, the thickness of the battery can be correpsondingly reduced. Moreover, since the unitary cells are held under uniform pressure, deviation in lifetime of the cells can be eliminated.

BEST MODE FOR CARRYING OUT THE INVENTION

Figure 1:
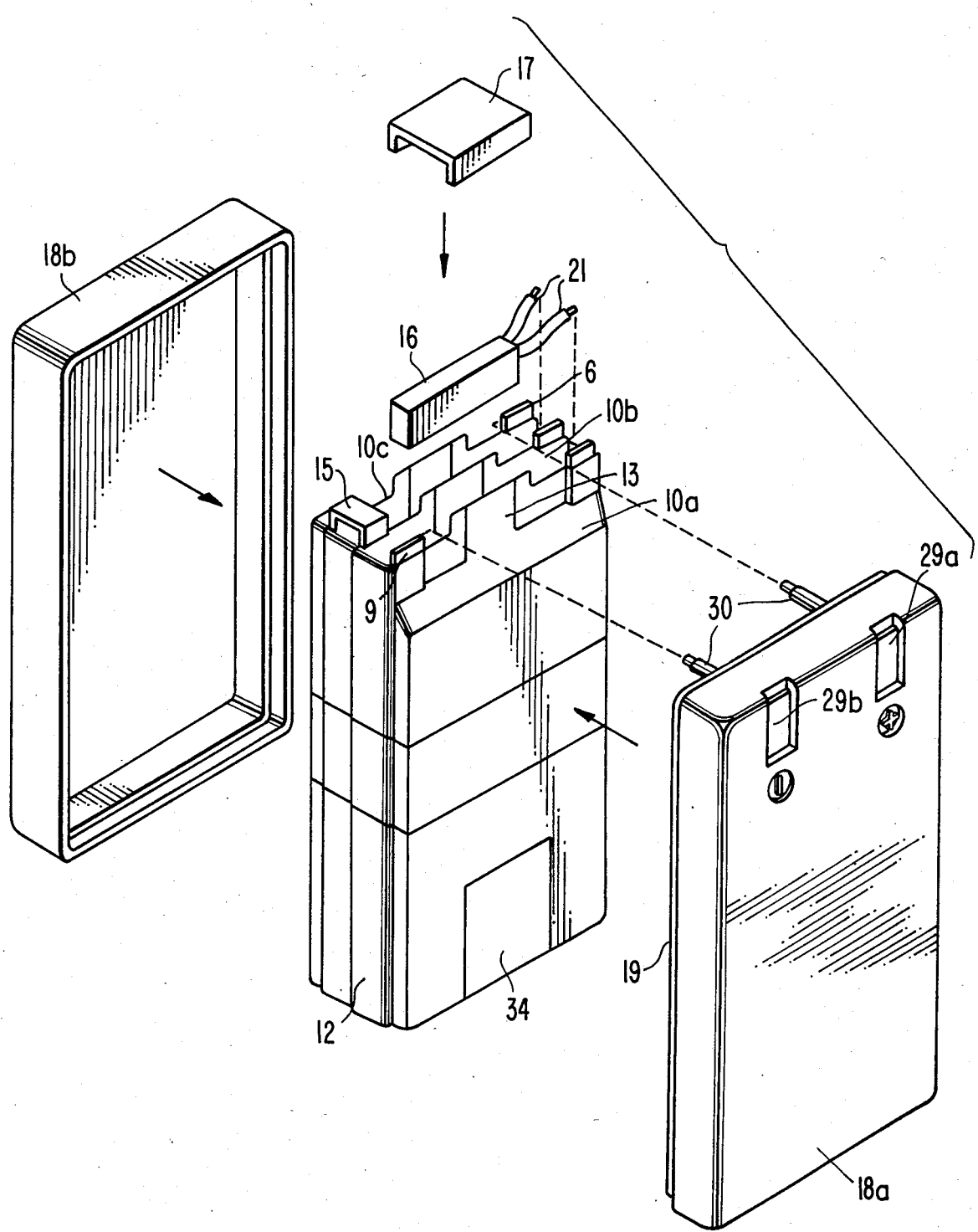
FIG. 1 is an exploded perspective view of a sealed lead storage battery in an embodiment of the present invention.
Figure 2:
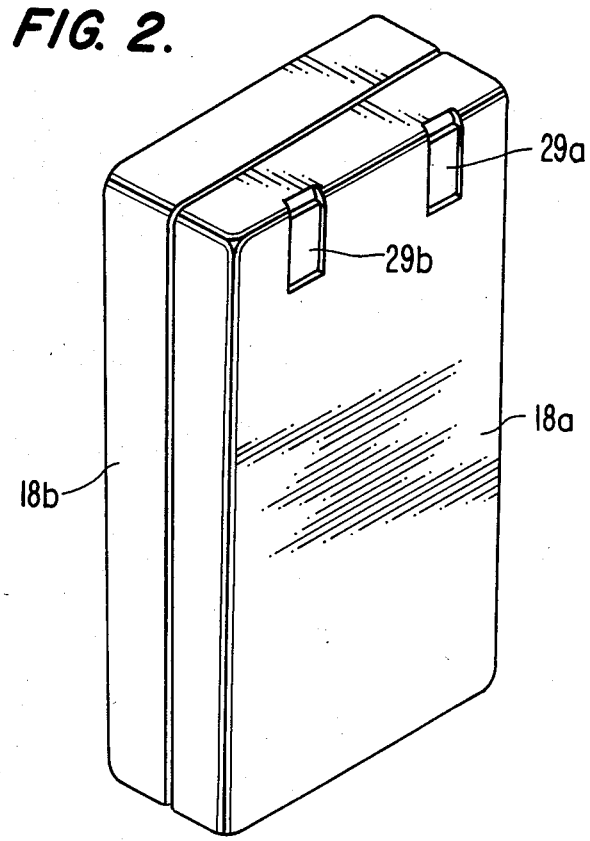
FIG. 2 is a perspective view of the battery.
Figure 3:
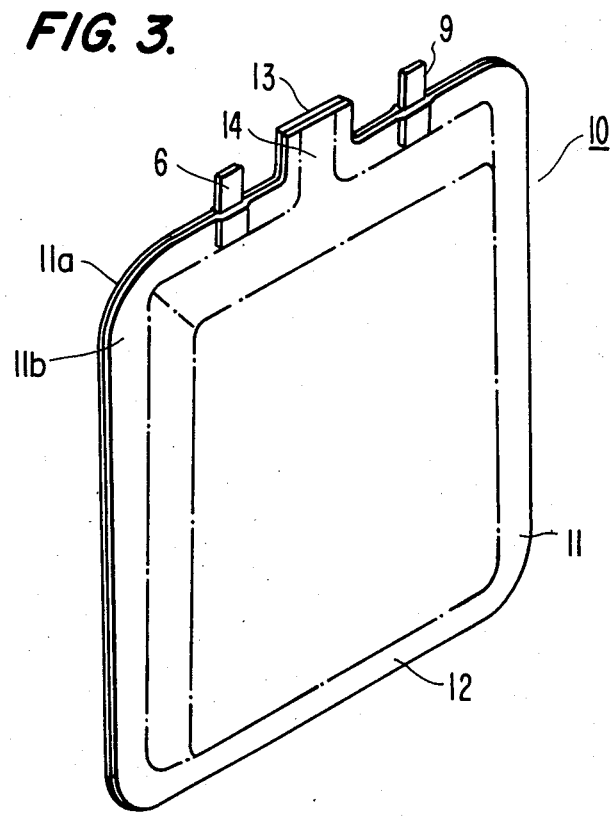
FIG. 3 is a perspective view of a unitary cell.
Figure 4:
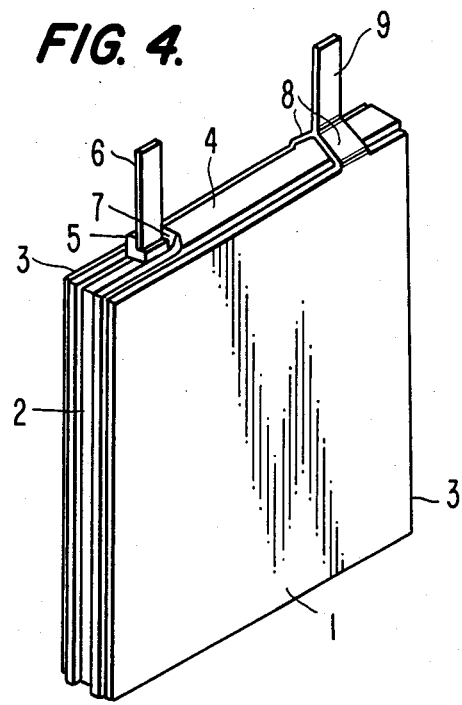
FIG. 4 is a perspective view of a polar plate group.

The details of the present invention will be described in connection with an embodiment of a sealed lead storage battery shown in the drawings.

In the drawings, 1 represents a polar plate group constituted by one anode plate 2, two cathode plates 3, 3, and a separator 4 of generally inverted U-shape separating both polar plates from each other. The anode plate 2 is provided at an upper end with a terminal fixture 5 to which a band-like terminal piece 6 is welded. This terminal piece 6 projects upwards through a cutout 7 provided in the separator 4 covering the anode plate 2. The cathode plates 3, 3 arranged exteriorly of the separator are provided at an upper end with terminal fixtures 8, 8 which are united together with a band-like terminal piece 9 by welding.

10 represents a unitary cell constituted by sealing the polar plate group 1 into an outer bag. The outer bag 11 is made of a film, 0.3 mm in thickness, of fusion-bondable synthetic resin, for example, polyethylene. In this example, the polar plate group is sandwiched between two films 11a and 11b, the peripheral regions of these films surrounding the perimeter of the polar plate group being fusion-bonded together to provide a sealed area 12. The terminal pieces 6, 9 extend outwards through the above described sealed area 12. In order to enhance the adhesion between these terminal pieces and the films 11a and 11b, it is preferred for the terminal pieces to be treated with resin beforehand.

13 represents a safety valve constituted by an overlapping area of the films and there is a non-bonded area 14 which, when the interior of the outer bag is excessively pressurized, will be internally spread by gas to define a gas passage through which the gas can be discharged to the outside. It is to be noted that this passage portion, although closed by adhesion of the films in overlapping relationship, is preferred to be applied with a non-drying liquid sealing agent such as, for example, silicone oil, for increasing the gas tightness during the closure thereof.

FIG. 1 illustrates three unitary cells 10a, 10b, 10c of the above described construction before they are accommodated in a battery casing. The unitary cells 10a to 10c are series-connected by a connector 15 and a thermostat 16 for protecting the unitary cells from being heated or fired upon the shortcircuiting. The details of the thermostat 16 will be described later. A safety valve portion is fitted with a liquid absorbent mat 17 of generally U-shaped configuration for absorbing electrolyte which would leak together with the gas. 18a and 18b represent casing halves molded from a synthetic resin, for example, a resin composition containing ABS resin and polycarbonate resin blended together, the opening of one of the casing halves 18a being provided with an engagement projection 19 serving concurrently as a fusion-bonding margin whereas the opening of the other of the casing halves 18b is provided with a recess into which the projection 19 is engageable.

If output/input terminals are constructed as such, even if a force, that is, a back ring, tending to restore to the original state from a bent state acts on a tip of a terminal piece 32, the result is that the extent to which the terminal piece tip is staked to an inner corner area of a rib 33 will be somewhat loosened, and the terminal piece maintains a good staked relation to the rib 33 and an engagement into a slotted corner in the surface side of the casing halves without being loosened. Moreover, the soldering of an end of a lead wire 30 to the terminal piece tip where a gap is formed between the rib 33 and the casing half can be favorably carried out because that heat concentration on the terminal piece tip can be expected.

The liquid absorbent mat 17 to be fitted to the safety valve 13 portion comprises 95 wt % of glass fibers of 0.7 $\mu$in fiber diameter and 5 wt % acrylic resin as a binder and is of a structure wherein points of intersection of the fibers irregularly positioned in a non-woven fabric form are fixed by the binder with minute interstices provided in a plural number among the fibers for the absorption of liquid, having an appropriate rigidity as a whole.

A specific construction of the liquid absorbent mat 17 may suffice to be formed by cutting a plate-like mat to a desired length and subsequently bending the opposite end thereof so as to represent a generally U-shaped configuration, and it can be arranged immobile so as to straddle the safety valve 13 portions of the three unitary cells 10a, 10b, 10c.

When fabricating the battery, a stack of the three unitary cells 10a to 10c is pressed to fit into the casing half 18a with which the output/input terminal portion is connected through the lead wire, and subsequently the casing half 18b is mounted from above with the application of a pressing force necessary to permit the respective openings of the casing halves to be interlocked with each other, the casing halves being then fusion-bonded together by ultrasonic waves. In other words, the battery casing is so designed that, in the condition wherein the respective openings of the casing halves 18a and 18b are interlocked together, each of the unitary cells can be applied with sufficient pressure, for example, a group pressure of 20 kg/dm$^2$, in a direction thicknesswise thereof. Also, the battery casing must have a rigidity sufficient to maintain the above described pressure.

It is to be noted that, when the unitary cells are inserted into the casing, lower left-hand and right hand sides of the sealed area of each unitary cell are bent, wherefor the increase of the size of the casing to a value greater than necessary is prevented. 34 represents a tape binding the three unitary cells 10a to 10c together.

Although in the above described example, the battery casing has been formed by fusion-bonding the longitudinal casing halves together, it may comprise a casing body open at its upper end, and a lid for closing the opening thereof.

Figure 5:
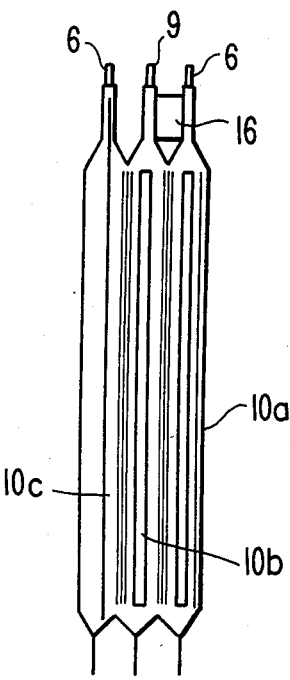
FIG. 5 is a schematic diagram showing the position of a thermostat between the unitary cells.

The thermostat 16 is, as is clear from FIG. 5, arranged in a space defined between upper regions of the unitary cells 10a, 10b for avoiding any possible abnormal heating and firing resulting from the shortcircuiting between the terminal pieces by assuredly detecting the temperature from the unitary cells, and requires no extra space for installation, thus contributing to the reduction in thickness of the sealed lead storage battery.

Figure 6:
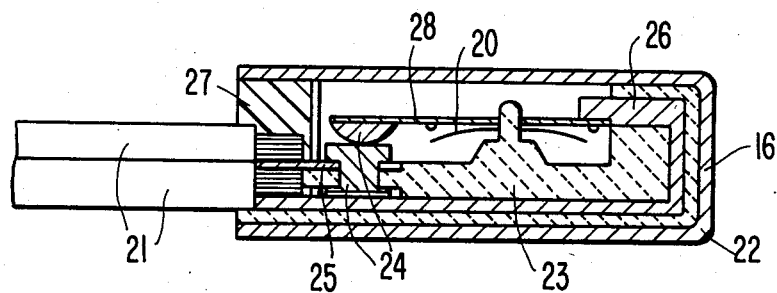
FIG. 6 is a sectional view of the thermostat.
Figure 7:
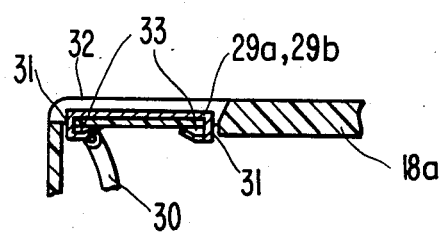
FIG. 7 is a sectional view showing a portion of a casing fixed with output/input terminals.

The specific construction of this thermostat 16 is as shown in FIG. 6. In the drawing, 20 represents a bimetal for the temperature detection, 21 represents two lead wires which altogether constitute a connecting terminal, 22 represents a metallic container, 23 represents an insulating substrate for the support of the bimetal, 24 represents contact points, 25 represents a contact plate, 26 represents a terminal plate, 27 represents an insulating filler for the sealing, and 28 represents a movable contact plate having its tip affixed with one of the contact points. As is clear from the drawings, one of the lead wires is connected to the contact plate, and the other thereof to the terminal plate. The other ends of the respective lead wires are, as clearly shown in FIG. 1, connected to the anode terminal piece 6 and the cathode terminal piece 9 of the neighboring unitary cells 10a, 10b, only the anode terminal piece and the cathode terminal piece of the outermost cells being connected through lead wires 30 with a pair of output/input terminals 29a, 29b provided in the casing half 18a. These output/input terminals 29a, 29b are, as clearly shown in FIG. 7, formed by passing generally U-shaped terminal pieces 32 from an outer surface of the casing half through a pair of slots 31 provided in the casing half 18a, and staking respective bent ends to ribs 33, which are formed by respective projections on an inner side of the slots, so as to encircle therearound.

Although the outer bag for the unitary cell has been shown as constituted by the two films or sheets, it may be constituted by bending a single film or sheet, or a film or sheet in the form of a tube. In the former case, the three sides which are open should be formed into a sealed area, and in the latter case, the two sides should be formed into a sealed area.

The safety valve provided in the outer bag, although it has been shown as constituted by the films sheets forming the outer bag, may be a safety valve constructed separately from the films or sheets and may then be fitted to the outer bag at a suitable location.

Also, although the battery referred to hereinbefore is a sealed lead storage battery, the present invention can be applicable to a sealed alkaline storage battery utilizing an alkaline electrolyte, for example, a nickel-cadmium storage battery.

According to the present invention, since the sheets or films of synthetic resin forming the outer bag for the unitary cell play a role of partition walls in the conventional battery case, the battery having a thickness smaller that that of the conventional one can be obtained. Moreover, since there is no partition wall in the casing for separating the cells from each other, the uniform pressure acts on the unitary cells and, therefore, deviation in performance resulting from the uneven pressure can be eliminated.

INDUSTRIAL APPLICABILITY

As hereinbefore described, the present invention is such that the plurality of the unitary cells are uniformly pressurized by the casing while having been accommodated in a form stacked in the direction thicknesswise, and is effective to provide the sealed storage battery, excellent in capacity efficiency, easy to fabricate with reduced thickness, high in reliability, and suited as an electric power source for portable electric appliances.

We claim:

1. A sealed storage battery comprising: a plurality of flattened unitary cells each having a polar plate group, including an anode plate, a cathode plate and a separator separating the polar plates from each other, an electrolyte retained by the polar plate group, and an outer bag in which both the polar plate group and the electrolyte are sealed, said bag being made of a film or sheet of synthetic resin; a safety valve in the outer bag for each unitary cell; a rigid casing accommodating the unitary cells in a stack extending in the thickness direction of said cells and having a space in the upper portion thereof between adjacent cells, said unitary cells being held under pressure in the stacked direction; and a thermostat electroconductively connecting said cells in series and provided in said space.

2. The sealed storage battery as defined in claim 1, further comprising a liquid absorbent mat straddling the safety valves in the outer bags of the unitary cells.

3. The sealed storage battery as defined in claim 2, wherein the liquid absorbent mat has a generally U-shaped configuration.

4. The sealed storage battery as defined in claim 1, wherein the separator for each unitary cell is of a generally inverted U-shape.

5. The sealed storage battery as defined in claim 1, further comprising a pair of output/input terminals in said casing, and lead wires extending from the unitary cells and having the ends soldered to inner ends of the output/input terminals.

6. The sealed storage battery as defined in claim 1, wherein the safety valve is constituted by a tight contact area defined by the overlapping of the sheet or film of synthetic resin forming the outer bag.

7. The sealed storage battery as defined in claim 6, wherein the tight contact area of the sheet or film of the safety valve has a non-drying liquid sealing agent thereon.

8. A sealed storage battery which comprises: a plurality of flattened unitary cells each having a polar plate group, including an anode plate, a cathode plate and a separator separating the polar plates from each other, an electrolyte retained by the polar plate group, and an outer bag in which both the polar plate group and the electrolyte are sealed, said outer bag being made of a film or sheet of heat-fusible synthetic resin having a resistance to the electrolyte; a safety valve in the outer bag for each unitary cell; a rigid casing having an electric insulating material and accommodating the unitary cells in a stack extending in the thickness direction of said cells and having a space in the upper portion thereof between said cells; a thermostat electroconductively connecting the cells in series with each other and provided in said space; a liquid absorbent mat straddling the upper portions of the unitary cells, and a pair of output/input terminal in said casing and electrically connected with the anode and cathode terminal of the unitary cells, said unitary cells being pressurized in the stacked direction by said casing.

* * * * *